United States Patent
Züger

(10) Patent No.: US 8,882,613 B2
(45) Date of Patent: Nov. 11, 2014

(54) SYSTEM FOR CAPTURING TENNIS MATCH DATA

(75) Inventor: Christian Züger, Dürnten (CH)

(73) Assignee: Kitris AG, Durnten (CH)

( * ) Notice: Subject to any disclaimer, the term of this patent is extended or adjusted under 35 U.S.C. 154(b) by 718 days.

(21) Appl. No.: 12/677,374

(22) PCT Filed: Sep. 14, 2007

(86) PCT No.: PCT/CH2007/000448
§ 371 (c)(1), (2), (4) Date: May 19, 2010

(87) PCT Pub. No.: WO2009/033298
PCT Pub. Date: Mar. 19, 2009

(65) Prior Publication Data
US 2010/0279800 A1 Nov. 4, 2010

(51) Int. Cl.
G08B 23/00 (2006.01)
A63B 71/06 (2006.01)
A63B 24/00 (2006.01)
A63B 69/38 (2006.01)

(52) U.S. Cl.
CPC ......... *A63B 24/0021* (2013.01); *A63B 71/0669* (2013.01); *A63B 2220/12* (2013.01); *A63B 2243/0075* (2013.01); *A63B 69/38* (2013.01); *A63B 2024/0025* (2013.01); *A63B 2243/0083* (2013.01); *A63B 2225/20* (2013.01); *A63B 2220/13* (2013.01); *A63B 2071/0663* (2013.01); *A63B 2225/50* (2013.01)
USPC ........... 473/459; 473/461; 473/463; 473/464; 473/446; 473/451; 463/47; 463/3; 463/4; 463/1

(58) Field of Classification Search
USPC ......... 463/1–9, 20, 23, 25, 30–32, 34, 36–37, 463/40–43, 46–47, 50, 53–54, 56–57; 273/108.1, 108.3, 108.4, 118 R, 150, 273/244, 244.1, 247, 259, 317.1, 317.3, 273/317.4, 317.5, 317.6, 359, 406, 440.1, 273/460–461; 340/323 R, 323 B; 377/4–5; 446/415; 473/459, 468, 498–499, 504, 473/564–565, 598, 600, FOR. 102, 473/FOR. 135, FOR. 169, FOR. 192, 71, 473/244, 407, 438, 446–451, 461–464
IPC ....................................................... A63F 13/12
See application file for complete search history.

(56) References Cited

U.S. PATENT DOCUMENTS 5,486,001 A 1/1996 Baker
5,681,108 A 10/1997 Miller
(Continued)

FOREIGN PATENT DOCUMENTS

GB 24012501 11/2004
JP 2004274248 9/2004
(Continued)

OTHER PUBLICATIONS

International Search Report in corresponding PCT/CH2007/000448 mailed Apr. 2, 2008.

*Primary Examiner* — Sunit Pandya
(74) *Attorney, Agent, or Firm* — Marshall, Gerstein & Borun LLP

(57) ABSTRACT

The present invention relates to a system and a method for gathering ball game data and in particular tennis match data in real time. To this end the system comprises a hands-free voice receiving means (4) adapted to receive words spoken by the player (2) wearing the receiving means. The words are then analyzed by an analyzing means adapted to analyze a dedicated ball game vocabulary used by the player. The analysis of the spoken words translates these words into digital match data. This data can be displayed, at least as score of the game by a display (10). More elaborate match data information can be gathered. Such data may be fed to an expert system giving back advice to the player.

15 Claims, 7 Drawing Sheets

(56) References Cited

U.S. PATENT DOCUMENTS

| | | |
|---|---|---|
| 5,694,340 A | 12/1997 | Kim |
| 5,779,566 A | 7/1998 | Wilens |
| 5,898,751 A | 4/1999 | Yakoby et al. |
| 6,012,995 A * | 1/2000 | Martin .................. 473/459 |
| 8,160,640 B2 * | 4/2012 | Rofougaran et al. ...... 455/556.1 |
| 2002/0004723 A1 | 1/2002 | Meifu et al. |
| 2002/0072815 A1 | 6/2002 | McDonough et al. |
| 2002/0079433 A1 | 6/2002 | Vock et al. |
| 2002/0132211 A1 | 9/2002 | August et al. |
| 2003/0204275 A1 * | 10/2003 | Krubeck .................. 700/91 |
| 2004/0077438 A1 * | 4/2004 | Choi ...................... 473/553 |
| 2004/0158337 A1 | 8/2004 | Forest |
| 2004/0243261 A1 * | 12/2004 | King ...................... 700/91 |
| 2005/0196737 A1 * | 9/2005 | Mann ..................... 434/247 |
| 2005/0245317 A1 * | 11/2005 | Arthur et al. ............. 463/42 |
| 2006/0025220 A1 * | 2/2006 | Macauley et al. ......... 463/42 |
| 2006/0025229 A1 * | 2/2006 | Mahajan et al. .......... 473/131 |
| 2007/0155510 A1 * | 7/2007 | Galvin et al. ............ 463/43 |

FOREIGN PATENT DOCUMENTS

| | | |
|---|---|---|
| JP | 2005198818 | 7/2005 |
| WO | WO03/062950 | 7/2003 |
| WO | WO2004/058364 | 7/2004 |
| WO | WO2004/114203 | 12/2004 |
| WO | WO2005/072831 | 8/2005 |

* cited by examiner

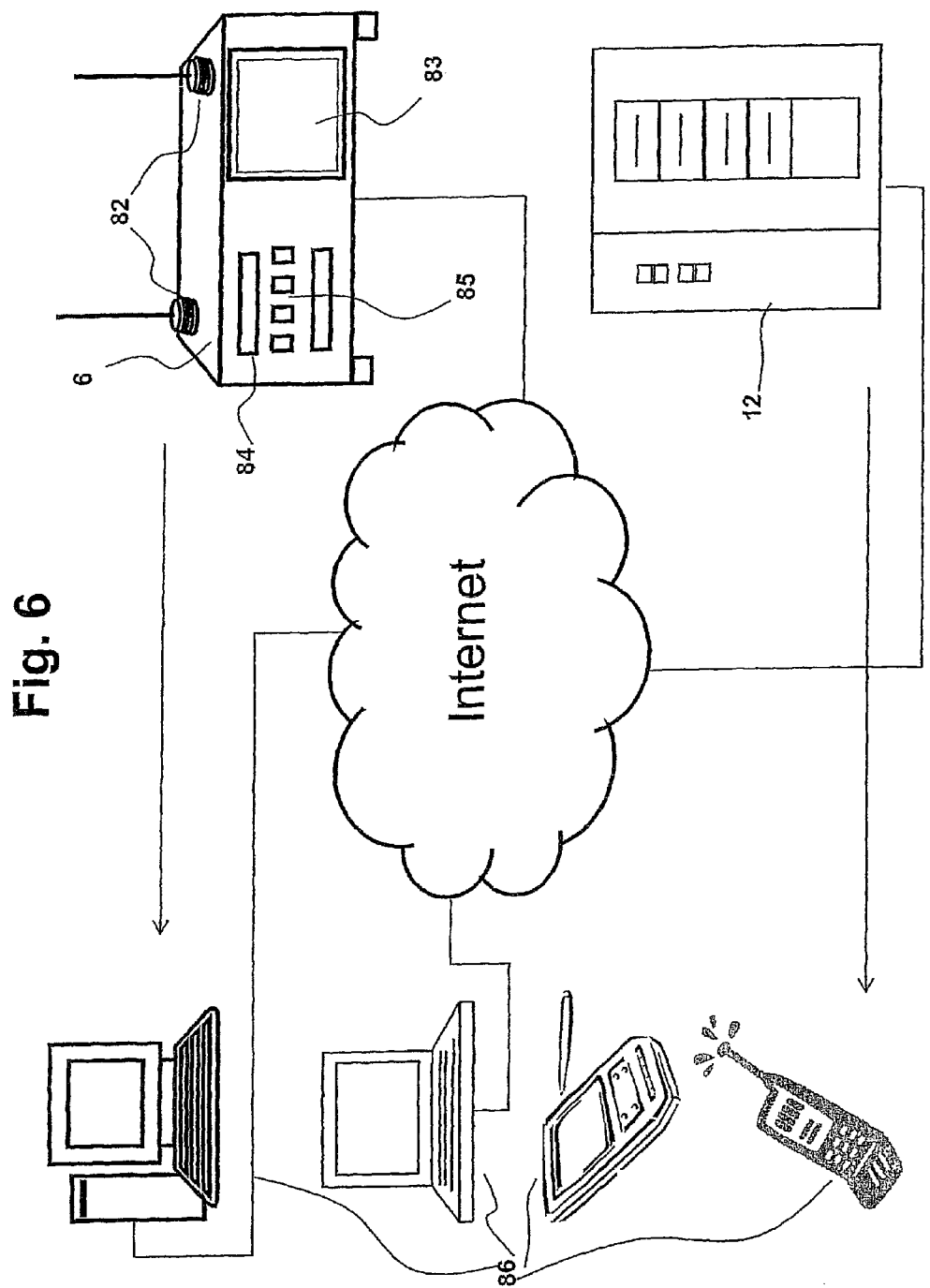

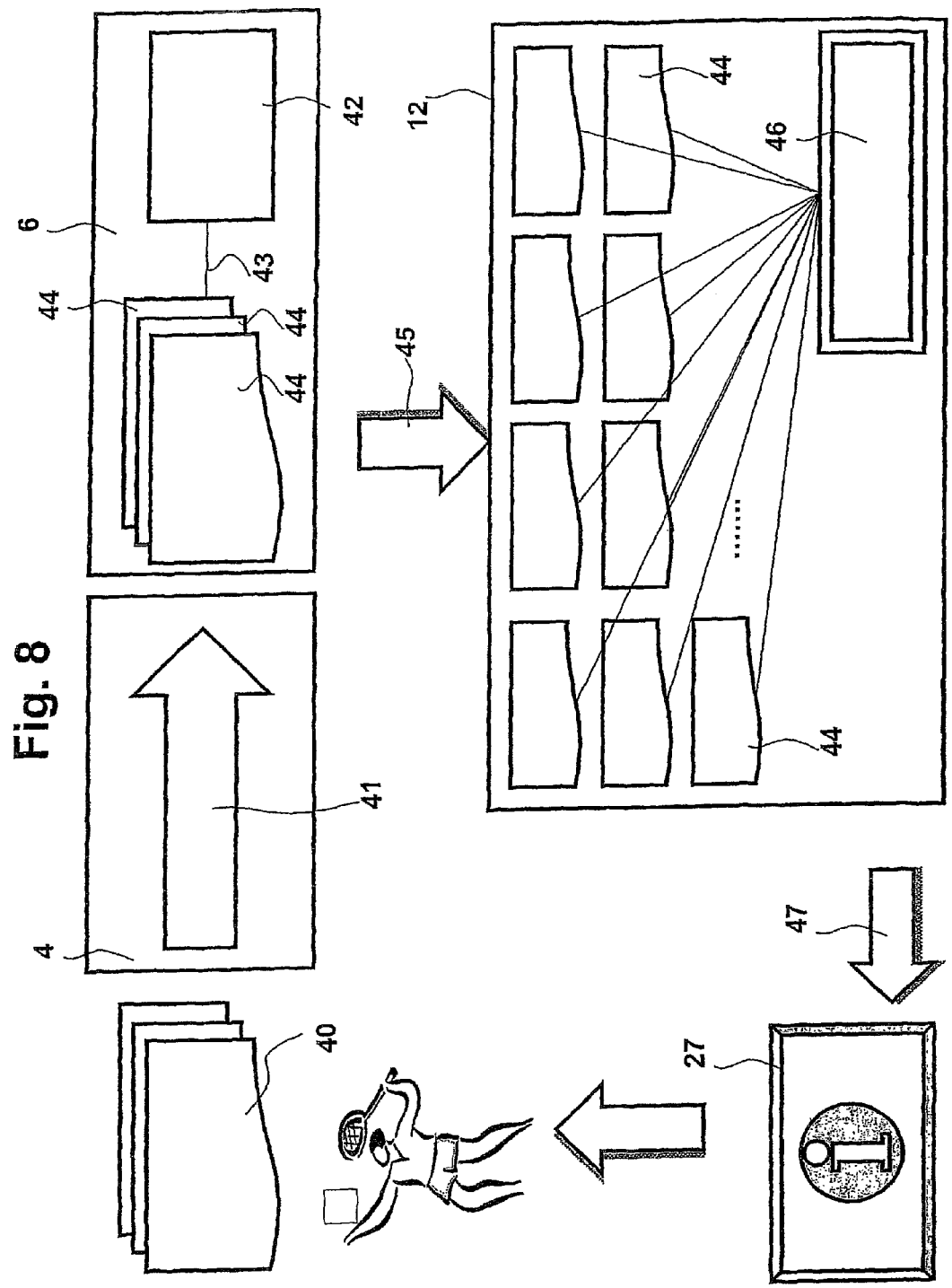

SYSTEM FOR CAPTURING TENNIS MATCH DATA

TECHNICAL FIELD

The invention relates to a system for capturing personal player match data of a ball game and in particular tennis match data of a tennis player. The invention further relates to a method for capturing personal player match data of a ball game and in particular tennis match data of a tennis player.

BACKGROUND OF THE INVENTION

Ball games are very popular and tennis in particular has become one of the major popular and professional sports. For the non-professional tennis players there are several ways of improving their game. Training with a tennis coach, self-training by using a ball machine or a return-wall and books and videos improve mainly the technical skills. Tactical coaching on the other hand is hardly available for the non-professional player despite the fact that many matches are decided rather by tactical competence than by the technical skills. The professional player enjoys all the advantages of a personal coach who follows the match, takes notes and videos of the different situations and scenes during a match and discusses his findings with the player. The importance of match data has been known for a long time and recording match data by hand on a match sheet is still in use but needs as well a coach or another skilled person, who may be not available to the non-professional player. Even if there is such a person, he/she may have no direct access to the court or only an obstructed view on the court, so that the taking of the match data is difficult. During the last 10 years more and more electronic devices have come to the market allowing to improve on the manual collection of the match data. Handheld devices such as pocket computers or laptops with commercially available software give the possibility to enter the data and to show match statistics as shown during TV coverage of tennis games, such as break points won and unforced forehand errors. Those statistics are useful for a professional but need further professional comments (of a coach) to be helpful for the public. Such electronic devices are thus of only limited usefulness for the non-professional player wanting to improve his game.

Information about the score of the game is another area where professional sports and non-professional sports and in particular tennis matches differ enormously. In professional sports the spectators are informed by large electronic scoreboards and the score is updated by the staff of the tournament. In non-professional tennis, even during tournaments, the players have to take and display the score by themselves, by mechanical or digital devices, usually during the change of sides after two games. Usually only the games won are displayed. There is no display for the points and it is not feasible that a player has to turn to a scoreboard after each point. Accordingly, a spectator that does not continuously follow the match or has only an obstructed view on the court is not informed about the actual score. Thus non-professional tennis is not very attractive to follow for supporters of the players. The situation is even worse if the matches of a tournament are held at different locations. In this case even the tournament direction receives the match results after the match. There is no possibility for the supporters to follow the scores outside the court, be it in a lounge or on the Internet.

As mentioned above, electronic devices are known for taking scores of ball games, such as golf, and in particular tennis. For tennis, US 2004/0243261 A1 teaches a system and a method for capturing and analyzing data from a tennis match by using a video camera or by manually entering match data in a handheld device. For golf US 2002/0072815 A1 describes a golf information system with a handheld device that may replace a caddie by storing information on the golf course. The handheld includes a microphone and a voice recognition interface so that voice commands may initiate software functions. U.S. Pat. No. 5,681,108 teaches as well a handheld portable data system for golf that allows data to be input, output and stored using voice recognition commands. U.S. Pat. No. 5,779,566 shows a manually operated handheld golf data recording, reporting and advising unit. US 2004/0158337 A1 teaches a computer system for advising and instructing a player of a sport. US 2002/0132211 A1 shows a coaching system for sports with several players in which a central coach gives audio information to the players. JP2004274248 aims at improving golf skills by transmitting video information to an instructor and transmitting voice instructions by the instructor to the player. GB 2 401 501 shows a handheld device with GPS for golfers that can give a voice message to the golfer. U.S. Pat. No. 5,486,001 shows a golf video analysis system. US 2002/00004723 A1 shows a golf data management system with a handheld device. WO 03/062950 shows a portable golfer's electronic assistant device which allows audio recording and reproduction. U.S. Pat. No. 5,694,340 teaches a method of training with digital motion analysis. JP2005198818 relates to motion analysis and WO 2005/072831 as well relates to this art. US 2002/0079433 provides a golf feedback system and WO 2004/114203 shows a system and a method for recording activity such as a golf swing.

DISCLOSURE OF THE INVENTION

It is an object of the invention to provide a system and a method to capture personal ball game data of a player of fast games, such as tennis or squash or similar games. Another object of the invention is to provide actual match data and in particular match score to the players and, if the case may be, to spectators. Yet another object of the invention is to provide the player with meaningful statistics on his play or with coaching instructions based on his match data.

In order to implement these and still further objects of the invention, which will become more readily apparent as the description proceeds, the system for capturing personal ball game data of a player and in particular tennis match data of a tennis player comprises a hands-free voice receiving device comprising a microphone adapted to record words spoken by said player during the game, a dedicated vocabulary adapted to describe game action of the player and in particular a dedicated tennis match vocabulary adapted to describe tennis match action of the player, a voice analyzing device adapted to analyze said words received by said voice receiving device and spoken in said dedicated game or tennis match vocabulary, and at least one display device for displaying at least the current score of said game or tennis match, respectively, depending on the output of said voice analyzing device.

The method for capturing personal ball game data or tennis match data, respectively, of a player of a ball game and in particular a tennis player comprises the steps of audibly describing ball game action or tennis match action, respectively, by said player or tennis player in a dedicated ball game vocabulary and in particular a tennis match vocabulary, adapted to describe the game action of the player and in particular tennis match action of the player, receiving the voice of said tennis player during a tennis match by a hands-free voice receiving device comprising a microphone, analyzing said words received by said voice receiving device and spoken in said dedicated ball game or tennis match vocabulary by a voice analyzing device adapted to identify said ball game or tennis match vocabulary, respectively, and displaying at least the current score of said game and in particular of said tennis match by at least one display device responsive to the output of said voice analyzing device.

The system and method of the invention allows to capture the game action, at least comprising the score, by hands-free receiving spoken game specific words by the player during and without hindering the game action that can be analyzed so that match data of the game can be taken from the words. This allows displaying match data for fast ball games where a ball is played between two or more players during the game without other persons involved in the capturing than one of the players. The system or method is particularly suited for tennis or squash games where two or four players are involved.

In a preferred embodiment the system and method comprises a hands-free voice receiving device including a housing adapted to be worn on the body of said tennis player or to be worn on the clothes of said tennis player, and in particular in form of a wristwatch like housing. In another embodiment the voice receiving device comprises a voice receiving device fixed to or incorporated within the racket of said tennis player. The voice receiving device communicates wirelessly or by wire with said voice analyzing device.

The system may comprise a portable battery driven base station adapted to connect to said voice receiving device and adapted to connect to said display device. Connections in the system and the method between the elements thereof may be wireless or by wire. Connection may as well be made over the internet. A preferred connection is made with an expert system running on a computer and analyzing match data in order to give coaching advice. Such advice is given back to the system and is displayed there for the player.

BRIEF DESCRIPTION OF THE DRAWINGS

Further advantageous features and applications of the invention can be found in the dependent claims as well as in the following description of the drawings illustrating the invention. In the drawings like reference signs designate the same or similar parts throughout the several figures of which:

FIG. 6 shows a base station and its connection to other devices;

FIG. 8 shows schematically the generation of an electronically generated coach message.

MODES FOR CARRYING OUT THE INVENTION

Figure 1:
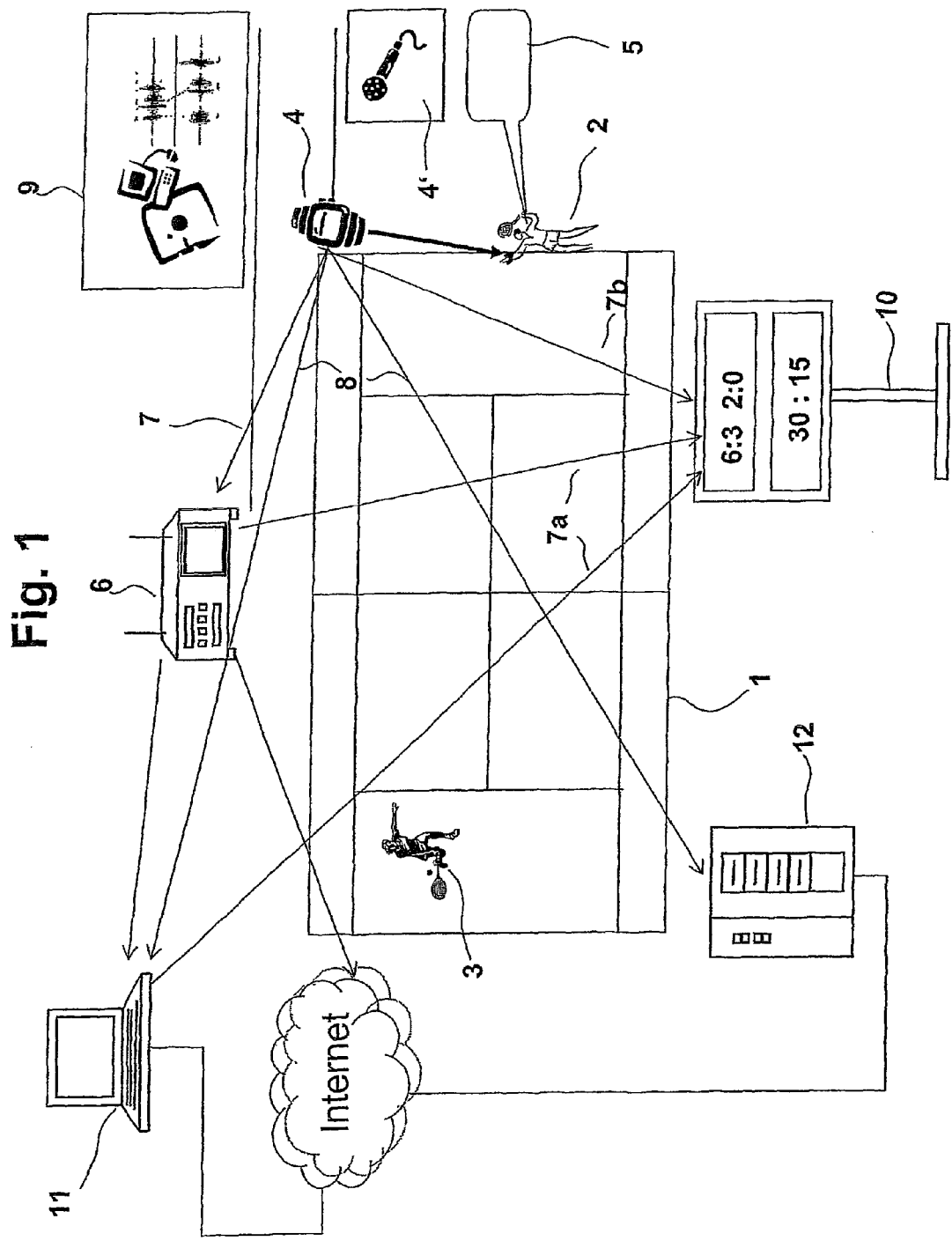
FIG. 1 shows a schematic representation of a tennis court and various elements of systems according to the invention.

FIG. 1 shows a schematic representation of a tennis court 1 with players 2 and 3. Player 2 uses the system and method according to the invention. To this end player 2 is provided with a hands-free voice receiving device 4 which is shown in this embodiment with a housing in form of a wristwatch. Device 4 is shown on the wrist of player 2 and for a better explanation in enlarged view. Pictogram 4' is used to show that voice receiving device 4 is provided with a microphone to receive words spoken by player 2. Such words are symbolized by pictogram 5 in FIG. 1. Voice receiving device is hands-free which means that the player using this device is not distracted from the game when entering match data by the need to hold the device in his hand. The device may include manual operating elements, for example an on/offswitch, a mode switch or similar switches or knobs, but for the entering of match data by spoken words the player does not need to use his hands which gives normal freedom of play despite the use of the system.

Preferably, voice receiving device 4 is wirelessly connected to a voice analyzing device which may be implemented by a personal computer running a software for analyzing the spoken words of player 2, as will be explained later, or may be implemented by a dedicated base station 6 that is more suitable to a tennis court environment than a personal computer. This base station 6 as well includes a computer and runs software for analyzing the spoken words of player 2. In one of the embodiments shown in FIG. 1 voice receiving device is wirelessly connected to base station 6 as symbolized by arrow 7 for transmitting the received words 5 directly— and preferably without storing the words in device 4—to the base station 6. Such a wireless connection can be provided by all short distance wireless communication device well known to the man skilled in the art. It is possible as well in another embodiment, that the voice receiving device 4 includes storing means for storing a number of words that are then transmitted together. The storing device may even store data of a whole set of the match which is transmitted only at the end of the set. Such transmission may then take place wireless or by wire by using a docking station for voice receiving device 4 or connecting voice receiving device 4 by a cable to computer or base station 6 between sets of the match.

Thus the words spoken by player 2 and representing match data are present in computer or base station 6 which implements the voice analyzing device that analyzes the spoken words and translates them into digital data representing at least the score of the game as will be explained later when the description proceeds to the dedicated vocabulary used by the player. To implement the voice analyzing device a speech recognizing software symbolized by box 9 in FIG. 1 runs on the computer or base station 6. Such software is known to the man skilled in the art and is commercially available. Recognizing the spoken words is a task well within the scope of such available software since the vocabulary for the present application is well defined and limited. Once the spoken words have been recognized and translated into digital data, a commercially available tennis match data software could be used to group this data into the usual tennis statistics and in particular to keep track of the score of the game. This software can use the data provided by the voice analyzing device as input data in the same manner as it would have used manually inputted data of an electronic match sheet, so that the adaptation of a known tennis match data software to the present system can be done by the man skilled in the art without problems.

Figure 2:
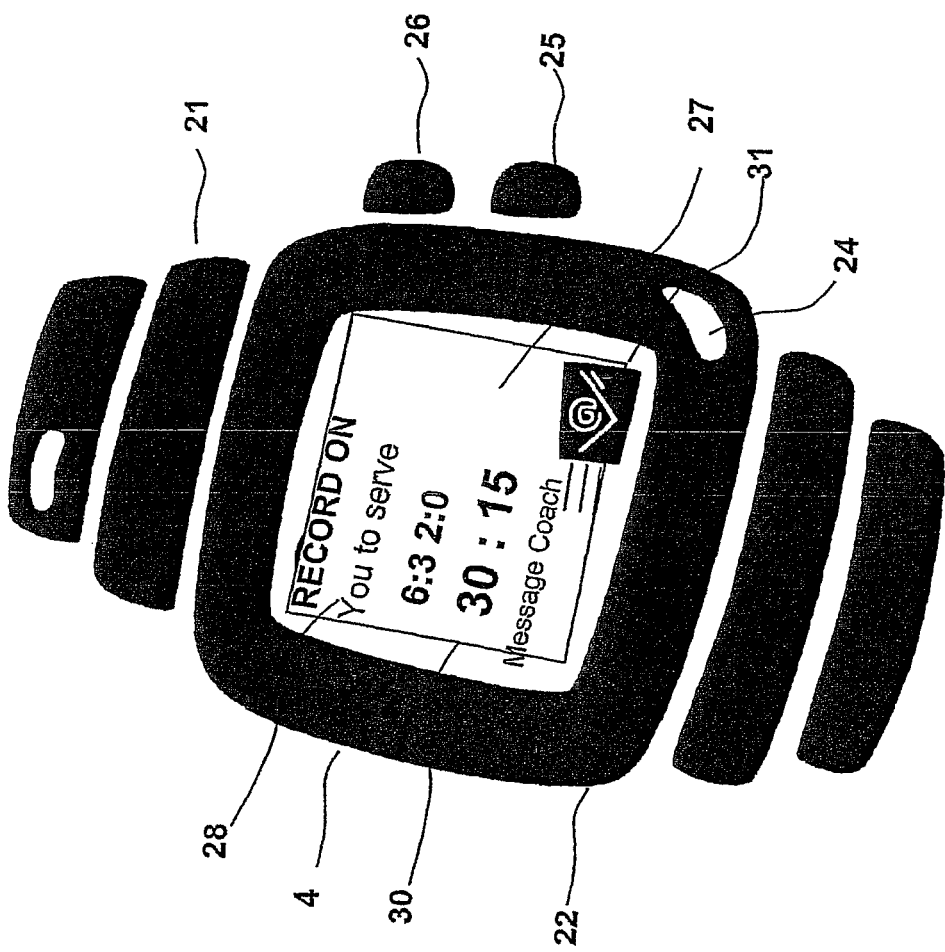
FIG. 2 shows voice receiving device in the form of a wristwatch.

According to the invention the game score is displayed on at least one display. FIG. 1 shows as a preferred example a public match score display 10 that can be viewed at least by the players 2, 3 but preferably as well by the spectators of the game. This display can be a well known mechanical or electronic display and needs no detailing here since such displays are known to the man skilled in the art. This display can be fed with the score by base station or computer 6 either by wire or wireless as shown by arrows 7a. The display may be a stationary display belonging to the tennis court or may be a small portable display belonging to the system. Another display is preferably provided by the voice receiving device 4 as shown in FIG. 2 where the wristwatch type receiving device is shown with a display 27. On this display the score of the game is shown with reference numeral 30. To provide the score on the voice receiving device 4 this device is provided with a wireless receiver and the computer or base station 6 transmits match data, and at least the actual score, to the voice receiving device 4 where the received data is displayed. In an alternative embodiment it may be provided that the voice receiving device being with the player comprises a voice analyzing device as well or even instead of the voice analyzing device in the computer or base station, so that in one embodiment the device 4 can keep track at least of the score of the game by the received words by itself without receiving signals by the computer or base station 6, so that the score of the game can be displayed on display 27 of device 4 directly. In such an embodiment of the system all elements thereof may be thus present on the player and there is no need for a base station 6 at all. In another embodiment the voice receiving device 4 may provide all of the voice recognition and conversion to digital data of the system so that not the spoken words are transmitted by device 4 to a computer or base station 6 but digital data of the recognized words or even digital data representing the match data. In this case display 10 may be controlled directly by device 4 worn by the player as indicated by arrow 7b.

The wristwatch type voice receiving device 4 as shown as an example in FIG. 2 comprises a housing 22 with a wristband 21 and the display 27. Microphone 24 is integrated in the housing. A transmitter with antenna 25 transmits words or data in analogue or digital form. All kinds of suitable wireless transmission technologies known to the man skilled in the art can be used to this end. An operating element 26 may be present for switching the device 4 on and off. It may as well be possible to correct the score or other data manually by element 26 if this is needed in special cases. Such corrections may be transmitted as well to the base station. The display 27 may show additional information such as shown with reference numeral 28.

In another embodiment the device 4 may include a GPS (Global Positioning System) receiver which allows to send the position of the player on the court 1 to the base station 6 or to another device. The base station may thus register relevant positions of the player during the play. The positions may be provided with a time information as is explained further below.

By providing an actual score of the game on a display by the spoken player words a first goal of the invention is met and allows better information of players and spectators about the score.

Other embodiments shown in FIGS. 1 and 2 will be explained as the description proceeds but beforehand the preferred dedicated vocabulary is described. It is preferred that the tennis match data is spoken in different steps providing different information levels. Preferably sub-steps are used within a step. In the first step only the information who has made the point is spoken so that with this step alone the system is working to display the actual score as explained below. Table 1 below gives the preferred dedicated vocabulary for the first step without sub-steps, or if sub-steps are used the table shows sub-step 1.

TABLE 1

| STEP | Sub-step | topic | value | variants | spoken | example |
|---|---|---|---|---|---|---|
| 1 | 1 | Own point or other players point | Colour | Own point with $1^{st}$. service | White | White |
| | | | | Own point with $2^{nd}$. service | Green | Green |
| | | | | Foreign point w. $1^{st}$. service | Black | Black |
| | | | | Foreign point w. $2^{nd}$. service | Red | Red |

Thus by speaking and receiving and analyzing one word, in the preferred example a word naming a color, the system and method can keep track of the score of the game and display the score as explained on at least one display.

In a preferred embodiment the match data will be described, received and analyzed by additional spoken words in more detail. Such details may or may not displayed and may be subject to a further analysis by a coach or by an expert system acting as a coach. The preferred additional vocabulary can be as shown in the following Table 2 for the sub-steps 2 and 3 of the first step.

TABLE 2

| STEP | Sub-step | topic | value | variants | spoken word | example |
|---|---|---|---|---|---|---|
| 1 | 2 | Kind of point | One digit | Winner | 1 | White 1 |
| | | | | Forced error | 2 | Green 2 |
| | | | | Unforced error | 3 | Black 3 |
| 1 | 3 | Service | text | Ace | Ace | White ace |
| | | | | Service winner | Win | Red win |
| | | | | Service winner with unforced return fault | Straigth | Green straight |
| | | | | My double fault | Double | Red double |
| | | | | His double fault | Double | Green double |

Thus a more detailed description can be spoken by player 2 and is received by voice receiving device 4 and is analyzed in the voice analyzing device. This more detailed description leads to the known corresponding tennis match data that may be displayed or may be kept for further study by the player or his coach or by an expert system.

The preferred vocabulary may comprise further steps:

In a further step 2 with sub-steps 1 to 4 it may be described what kind of strike player 2 has used, for example in sub-step 1: service, base line, return, attack, lob, passing, stop ball, volley, drive volley, half volley, half volley stop ball, volley stop, volley lob, smash and distress ball. The words used in the vocabulary may be in the same order: serve, base, turn, tak, lob, pass, stop, ley, hit, half, hap, volp, wing, ash, pat.

In sub-step 2 the information may be given whether the ball was hit forehand or backhand. This can preferably be done by using as first vocal an "o" in the above words for forehand hits and an "a" for backhand hits. Thus if the return by player 2 is made by a forehand hit he speaks "torn" and if the return is made by a backhand hit he speaks "tarn".

In sub-step 3 of step 2 it may be described if and what kind of spin has been used when hitting the ball: slice, flat/drive, and (top) spin. This may be spoken by using the past form with an "ed" at the end for the slice, with no special ending for flat/drive and with an "ing" at the end for (top) spin. Thus the forehand return with spin is spoken as "torning".

In sub-step 4 of step 2 the information can be given how hard the ball was hit: fast, medium, slow. This may be spoken by pronouncing the vocal of the hit differently. The harder the ball was hit the shorter the pronunciation of the vocal.

Figure 7:
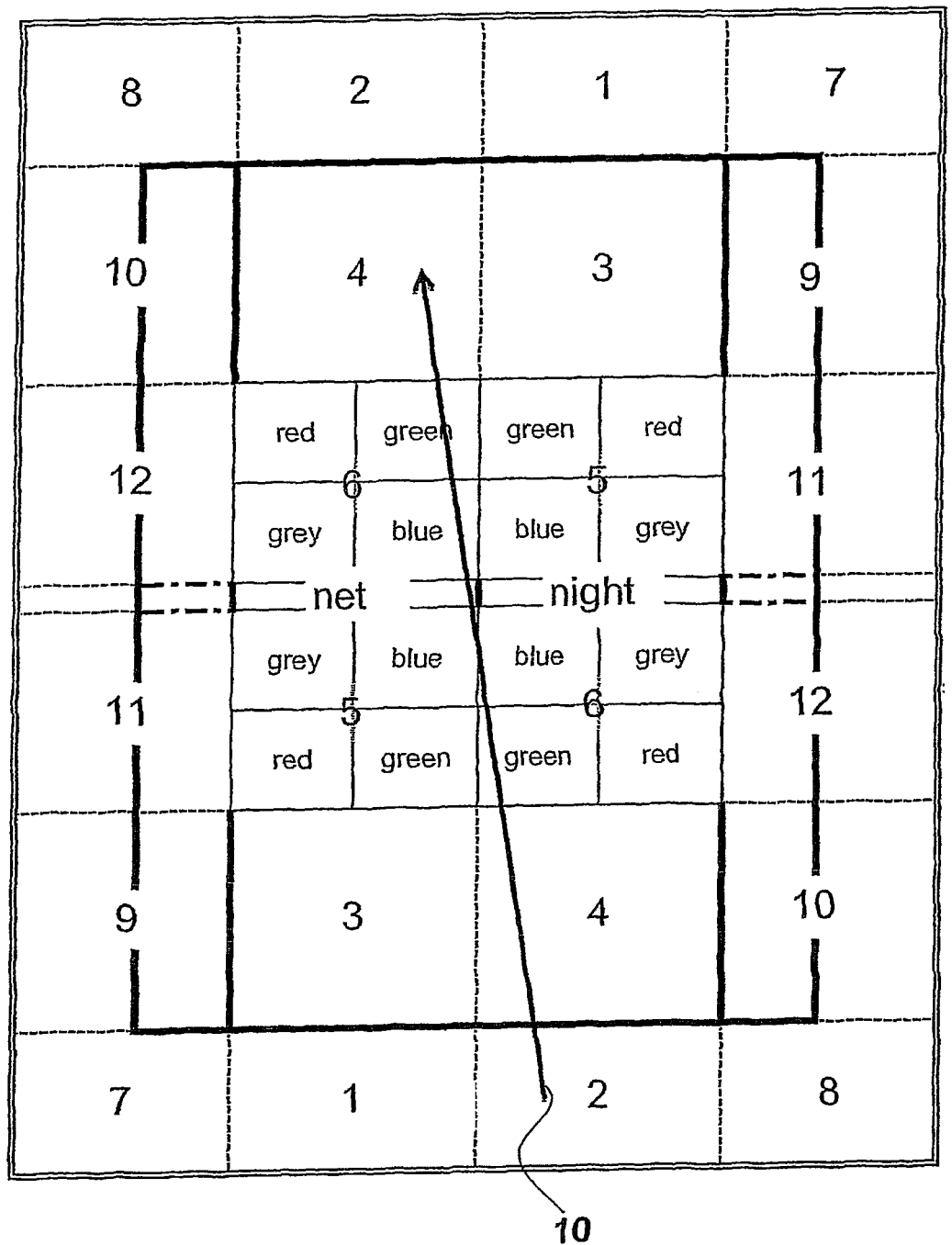
FIG. 7 shows a tennis court divided into different sections for the gathering of tennis match data.

In step 3 at last the information may be given at which player position the ball was hit and in which direction the ball was played. To this end the tennis court is virtually divided by the system into different fields as shown in FIG. 7 so that this information can be given vocally to the voice receiving device 4. Preferably the position and the direction are combined by a "to". So if player 2 has played his ball as shown by arrow 104 in FIG. 7 the vocal information given in step 3 would be "2 to 4".

To give an example of the preferred vocabulary a point made by player 2 wearing the voice receiving device 4 and by a forehand return after a first service of player 3 with slice and played from behind the base line long and cross and with unforced error of player 3 this would result in spoken information "white 3 torned 2 to 4". The "o" in torned may be pronounced long to indicate that the ball was played rather slow. Generally the last own strike is spoken and thus registered by the system. For an own double fault the $2^{nd}$. service only will be given into the system vocally. If the other player 3 serves an ace there is no own hit to be registered and thus the ace of the other player will be spoken into the voice receiving device by player 2. The information is spoken between rallies. The vocabulary can be learnt by self-study with audio-visual learning aids or in courses. By a dedicated vocabulary, in the preferred or in other forms, it is possible to receive all necessary information within seconds and without a delay of the game even for such a fast game as tennis.

Figure 3:
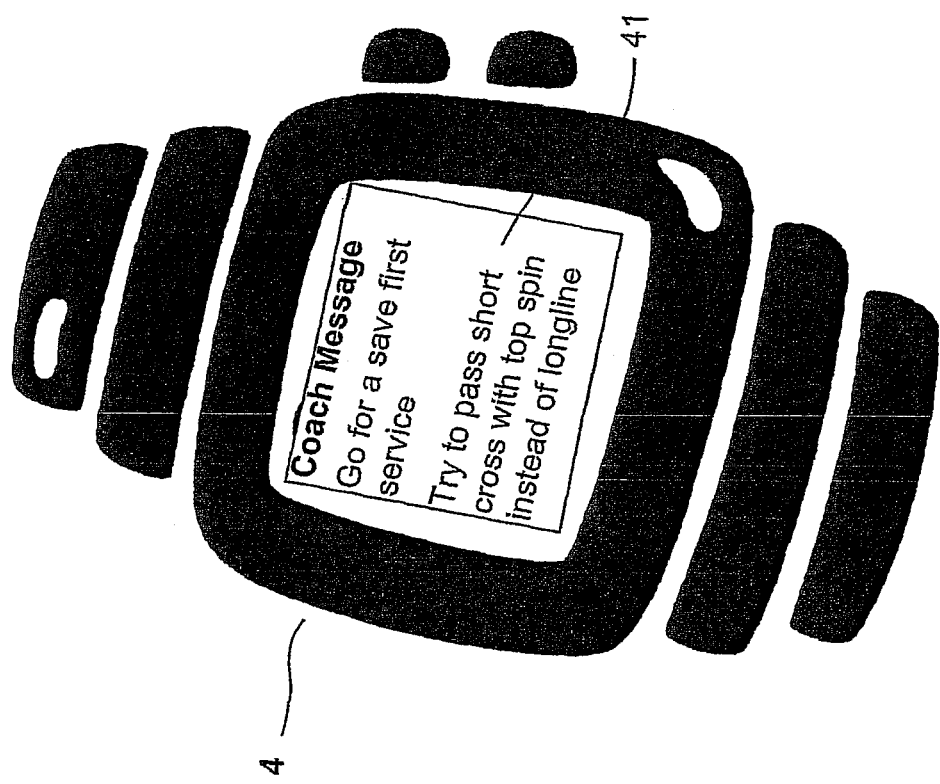
FIG. 3 shows the voice receiving device of FIG. 2 with a coach message displayed.

Turning back to FIGS. 1 and 2 additional embodiments are shown. Computer or base station 6 (or even device 4) may send the match data in its analyzed form or as raw data to another computer 11, either by wire or wireless, as shown by arrow 8. Such a computer 11 may be with a coach that judges the match data gathered by the system. This coach can then give advice to the player after the game or at a later date based on this match data. A coach may assist several players equipped with such a system in this way. It is as well possible that a coach gives advice to a player by using the system. To this end the player is equipped with a display on which advice by the coach can be displayed. Preferably this is the same display that may be provided on the voice receiving device. FIG. 2 shows that a coach message 31 has been received by device 4. Player 2 can display this message, for example by acting on a knob or switch 26. This displays the message 41 of the coach as can be seen in FIG. 3. The message can be sent by the coach using his computer 11 sending the message via base station 6 to the device 4. In another or additional embodiment, the computer or base station 6 and/or the computer 11 and/or even the voice receiving device 4 may contact a coaching computer 12, either directly (as shown by further arrow 8 for device 4) or as shown via the internet. Such a coaching computer may run tennis game analyzing software that is able to give electronically generated coaching instructions based on the vast amount of match information that can be provided by the player with the system when using the dedicated vocabulary to its full or near full extent. Such electronic coach services may be based on an expert system running on the computer 12 and may be available free or in paid mode to the owner of the system according to the invention. Messages by the electronic coach will be represented as in FIG. 3.

Figure 5:
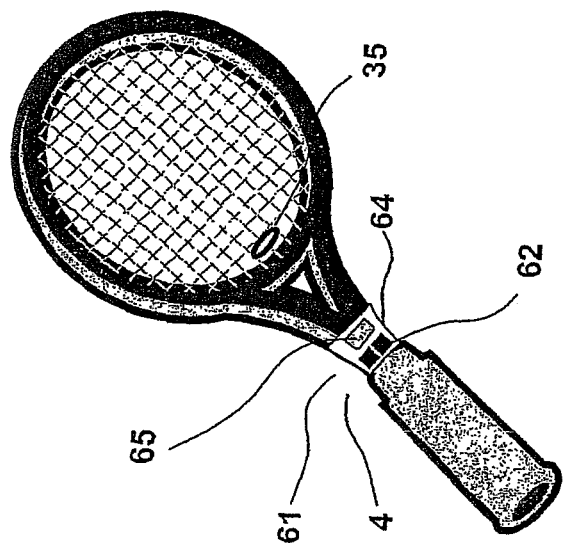
FIG. 5 shows the voice receiving device as part of a tennis racket.
Figure 4:
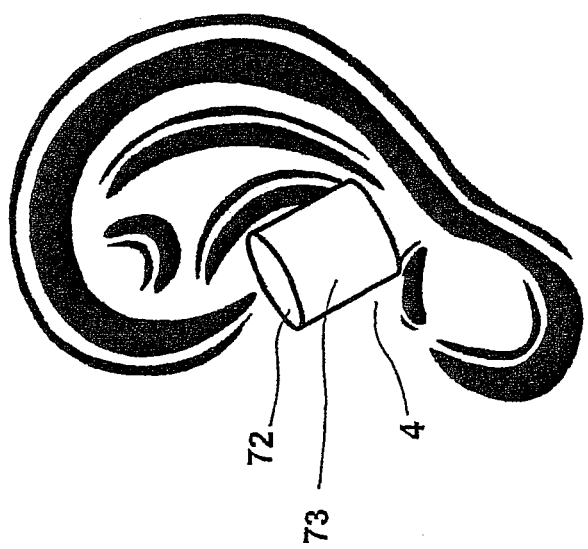
FIG. 4 shows a voice receiving device in the form of an earplug.

The voice receiving device 4 may as well be implemented by an earplug 73 or other device to be worn in or at the ear of the player as shown in FIG. 4 and comprising a microphone 72 and incorporating a transmitter to send received voice to base station 6 or to other devices as explained above. In this case it is preferred that messages to be given by the device 4 to the player are spoken words that the player can hear instead of read on a display. Another embodiment of the voice receiving device 4 is shown in FIG. 5 where this device is adapted to be fixed to the tennis racket 61 or is incorporated in the tennis racket. This device 4 comprises as well a microphone 64, an operating knob 62, a display 65 and a transmitter. All the devices 4 to be worn by the player are powered by rechargeable batteries or non-rechargeable batteries as is well known to the man skilled in the art.

A base station 6 is shown in FIG. 6 together with other devices 86 which may communicate with the base station and, if the case may be, with the electronic coaching computer 12. The base station 6 has a rugged construction suitable for use on tennis courts and is preferably provided with rechargeable batteries that allow operation for at least six hours. Flexible antennas 82 are used for communication of base station 6 with the voice receiving device 4 and other devices 86 and/or 12 as explained. A DVD RW-unit 84, operating elements 85 and a display 83 may be provided on the base station. On this base station 6, which is a computer, runs the voice analyzing software and, if the case may be, as well match data statistical software. Such software may run instead or additionally on one or several of devices 86 that communicate with base station 6, for example via the internet. Server 12 with its electronic-coaching capability may give advice by text, as shown in FIG. 3, as graphics, images, audio files or video files that can be heard or seen on base station 6 or the computer, respectively, and even, if the case may be, on voice receiving device 4, as already explained.

The tennis racket may comprise at least one sensor, for example a strain gauge, which output is transmitted to the device 4 or to base station 6. By these sensors it can be detected that a ball is hit. A time stamp will be assigned to each hit either by device 4 or by base station 6. Such information on a hit and the time are particularly useful if a GPS information on the player position is detected, as described above, since it is then possible to assign the position of the player to the moment when the ball is hit. In such an embodiment more detailed game data is provided. In FIG. 5 a sensor 35 is shown as an example.

FIG. 8 shows schematically the system with an electronic coaching of the player. In step 40 a match situation is vocally described by the player and his voice is received in step 41 by device 4 and transmitted to base station 6 where the voice analyzing device assigns in step 42 match data to the spoken words and enters this data in step 43 in a database. In this way a large number of data base entries 44 are generated. In step 45 this data is transmitted to server 12 which acts as electronic coach. A data interpretation is done by computer 12 in step 46 on the entries 44 during the match. This interpretation is done by an expert system type software that assigns a suitable advice on the basis of expert knowledge entered into the program beforehand to the match situations found in entries 44. Such advice is then sent in step 47 back to the system and in particular displayed on display 27 as shown for example in FIG. 3.

Thus the present invention relates to a system and a method for gathering ball game data and in particular tennis match data in real time. To this end the system comprises a hands-free voice receiving means 4 adapted to receive words spoken by the player wearing the receiving means. The words are the analyzed by an analyzing means adapted to analyze a dedicated ball game vocabulary used by the player. The analysis of the spoken words translates these words into digital match data. This data will be displayed, at least as score information of the game. More elaborate match data information can be gathered. Such data may be fed to an expert system giving back advice to the player.

It is to be understood that while certain embodiments of the present invention have been illustrated and described herein, it is not to be limited to the specific embodiments described and shown.

The invention claimed is:

1. A system for capturing personal tennis match data of a tennis player comprising:
   a voice receiving device comprising a microphone for recording words spoken by said tennis player during a tennis match,
   a dedicated tennis match vocabulary adapted to describe tennis match action,
   a voice analyzing device for analyzing said words spoken by the tennis player in said tennis match vocabulary and received by said voice receiving device,
   at least one display device for displaying the current tennis match score depending on the output of said voice analyzing device,
   wherein said voice receiving device communicates wirelessly or by wire with said voice analyzing device, and
   wherein said system further comprises a tennis racket comprising a sensor adapted to detect the hit of a ball, which sensor transmits its output to said voice receiving device and wherein said voice receiving device assigns a time stamp to each hit detected by said sensor.

2. The system according to claim 1, wherein said voice receiving device comprises a housing adapted to be worn on the body of said player or to be worn on the clothes of said player.

3. The system according to claim 2, wherein said voice receiving device comprises a wristwatch like housing.

4. The system according to claim 1, wherein said voice receiving device comprises a voice receiving device fixed to or incorporated within the racket of said tennis player.

5. The system according to claim 1, wherein said voice analyzing device comprises a portable battery driven base station for connection to said voice receiving device and for connection to said display device.

6. The system according to claim 1 comprising a GPS device detecting the position of the player.

7. The system according to claim 1 comprising a data connection device adapted to connect said system to a computer running a tennis match coaching software and adapted to receive coaching advice data from said computer and to display said coaching advice data on at least one display of said system.

8. A method for capturing personal tennis match data of a tennis player comprising the steps of:
   audibly describing tennis match action by said tennis player in a dedicated tennis match vocabulary for describing tennis match,
   receiving the voice of said tennis player during the play by a voice receiving device comprising a microphone,
   analyzing said words spoken by the tennis player and received by said voice receiving device by a voice analyzing device for identifying and analyzing said vocabulary,
   displaying the current score of said tennis match by at least one display device depending on the output of said voice analyzing device, wherein said voice receiving device communicates wirelessly or by wire with said voice analyzing device and
   the tennis racket comprises a sensor for detecting the hit of a ball which sensor transmits its output to said voice receiving device and said voice receiving device assigns a time stamp to each hit detected by said sensor.

9. The method according to claim 8, wherein said voice receiving device comprises a housing adapted to be worn on the body of said player or to be worn on the clothes of said player.

10. The system according to claim 9, wherein said voice receiving device comprises a wristwatch like housing.

11. The method according to claim 8, wherein said voice receiving device comprises a voice receiving device fixed to or incorporated within the racket of said tennis player.

12. The method according to claim 8, wherein said voice analyzing device comprises a portable battery driven base station for connection to said voice receiving device and for connection to said display device.

13. The method according to claim 8 comprising a portable display device for data communication with said voice analyzing device.

14. The method according to claim 8, comprising a GPS device detecting the position of the player.

15. The method according to claim 8, wherein a computer running a tennis match coaching software connects to the system for interpreting match data gathered by the system and for sending coaching information to the system, which is then displayed by the system, preferably on a display worn by the player during the play.

\* \* \* \* \*